April 8, 1969 C. H. LANE 3,436,817

METHOD OF MAKING FRINGING FIELD CONTROLLED THIN FILM ACTIVE DEVICE

Filed Feb. 13, 1967

INVENTOR.
CLYDE H. LANE
BY Harry A. Herbert Jr. and George Fine
ATTORNEYS

United States Patent Office 3,436,817

Patented Apr. 8, 1969

3,436,817

METHOD OF MAKING FRINGING FIELD CONTROLLED THIN FILM ACTIVE DEVICE

Clyde H. Lane, Rome, N.Y., assignor to the United States of America as represented by the Secretary of the Air Force Filed Feb. 13, 1967, Ser. No. 616,430
Int. Cl. H01c *17/00*
U.S. Cl. 29—620 1 Claim

ABSTRACT OF THE DISCLOSURE

A semiconductor device wherein a thin film of semiconductor material is deposited on an insulating substrate. On the semiconductor an insulating film is deposited. Contacts are made to the semiconductor through holes etched in the insulator film. On top of the insulator film two metal film plates are deposited with a small separation between the plates. A voltage applied across the plates results in a large fringing electric field. The field penetrates to the semiconductor and affects the resistance of the semiconductor. Thus, a voltage applied to the control plates modulates the resistivity of the semiconductor.

The invention described herein may be manufactured and used by or for the United States Government for governmental purposes without payment to me of any royalty thereon.

This invention relates to semiconductor devices and, more particularly, to a semiconductor device utilizing the fringing field of a thin film capacitor to vary the resistance of the semiconducting film.

The present invention provides a semiconductive device and the method of fabrication thereof wherein the device varies its conductivity in response to a fringing field of a thin film capacitor. The semiconductive device is comprised of a semiconductor layer which has an insulator film formed thereupon. The insulator film has a low dielectric constant relative to the semiconductor layer. Control plates are then disposed on the insulator film to provide a capacitive effect. The control plates have a gap disposed therebetween. A voltage applied between the control plates results in a fringing field. The fringing field across the gap is the strongest since the field lines are straight. Any excess field travels in a curved path. The larger the dielectric constant the more field lines will be contained.

As aforementioned, the insulator film has a low dielectric constant relative to the semiconductor layer. In this way the fringing field will drop down through the insulator film to the semiconductor. The fringing field then controls the conductivity of the semiconductor so that conductivity of the semiconductor varies in accordance wtih the magnitude of the fringing field. Thus a voltage in the control plates creates a fringing field which affects the conductivity of a semiconductor film. Thus, it is seen that the voltage on the control plates modulates the resistance of the semiconductor.

It is to be noted that aiding and opposing fields are possible by reversing the polarity of the voltage applied across the control plates. An opposing field results in an increasing resistance of the semiconductor and in an aiding field, a decrease in the resistance.

In the prior art, there is included a metal oxide semiconductor field effect device in which there exists a single control plate, source, and drain. However, this device does not operate in response to a fringing field and thus the present invention is distinguished therefrom.

An object of the present invention provides a semiconductor device utilizing the fringing field of a thin film capacitor to vary the resistance of a semiconducting film.

Another object is to provide the method of fabricating a semiconductor device wherein the device utilizes the fringing field of a thin film capacitor to vary the resistance of a thin semiconductor film.

The various features of novelty which characterize this invention are pointed out with particularity in the claims annexed to and forming part of this specification. For a better understanding of the invention, however, its advantages and specific objects obtained with its use, reference should be had to the accompanying drawings and descriptive matter in which is illustrated embodiments of the invention.

Figure 4:
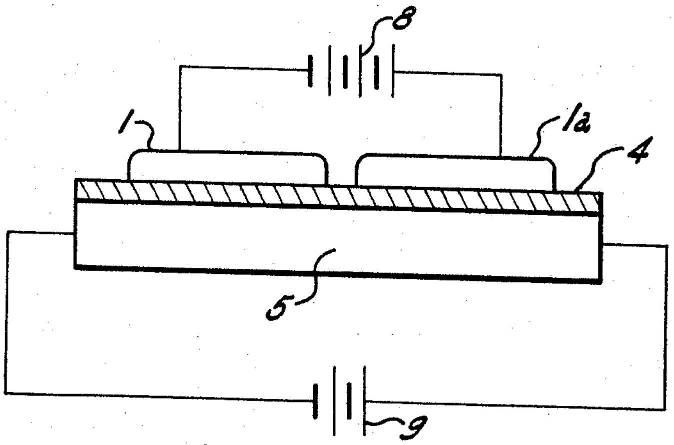

FIGURE 4 includes an embodiment of the invention showing the applied voltages.

Figure 1:
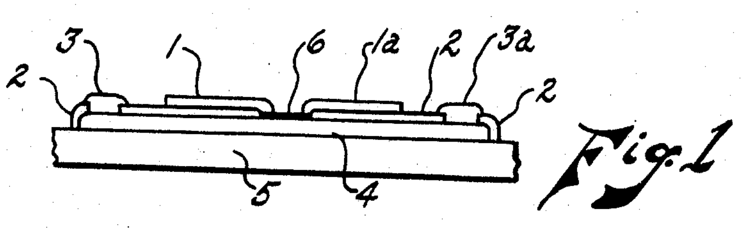
FIGURE 1 illustrates one embodiment of the present invention.

Now referring in detail to FIGURE 1, there is shown substrate 5 which is polished sapphire. Onto substrate 5, silicon 4 is electron beam evaporated at $1\times10^{-8}$ torr pressure to a thickness of two microns. Resistivity should be approximately 10 ohm-cm. A photoresist mask is applied and then all the silicon is etched away except a square 0.1 long by 0.1 inch wide. The silicon is then thermally oxidized to an oxide thickness of 0.5 micron as indicated by oxide 2. Through oxide 2 there is etched slot 6 through oxide 2. Slot 6 is 0.001 inch wide and is located in the center of the silicon resistor strip. Onto slot 6 there is pyrolytically deposited 1000 angstroms of oxide. Contact areas are etched out through the oxide at each end of the resistor strip.

Thereafter 1000 angstroms of aluminum is evaporated over the device and there is etched away all but that which covers the contact areas. The temperature of substrate 5 is raised to 570° for two or three minutes to alloy the aluminum and silicon at contacts 3 and 3*a*. Ten thousand angstroms of aluminum is then evaporated over the device. Thereafter contact pads 3 and control plates 1 and 1*a* are etched out. The contact areas can be 0.003 by 0.080 inch and the aluminum pads 0.004 by 0.100 inch. Control plates 1 and 1*a* are separated by as small a distance as possible. With good photoresist techniques nothing wider than 0.0005 inch need be considered.

Figure 3:
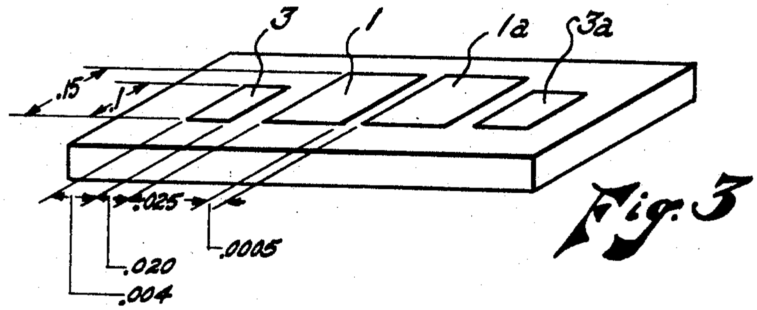
FIGURE 3 shows the topology of FIGURE 1.

All geometry control is based on the photoresist process, well known in the silicon integrated industry. FIGURE 3 shows the topology of the embodiment of FIGURE 1 wherein the dimensions of control plates 1 and 1*a* are indicated and also contacts 3 and 3*a*.

Now referring again to FIGURE 1, aluminum wire may now be ultrasonically bonded to contact pads 3 and 3*a* and to control plates 1 and 1*a*. A bias between the two contact pads gives rise to a current through the silicon film which behaves as a resistor. Applying bias by means of voltage sources 8 and 9 in the same sense as shown in FIGURE 4 produces an opposing field via the fringing field between control plates 1 and 1*a* and the induced charge in the semiconductor. This opposing field then changes the current between the contacts of the silicon resistor as a function of the bias on the control plates. It may also be stated that the capacitance of the control plates is a function of the bias on the silicon resistor.

To generalize, the resistor film can be any semiconductor, not just silicon. The substrate may be any smooth dielectric material, the metal for contacts need only make ohmic contacts, the material for the control plates can be any material which will allow a bias, and the dielectric separating the control plates from the semiconductor can be any dielectric material theoretically.

Practically, this dielectric must have as low a dielectric constant as possible, while the semiconductor should have as large a dielectric constant as possible. This is to obtain the maximum fringing field in the semiconductor.

Figure 2:
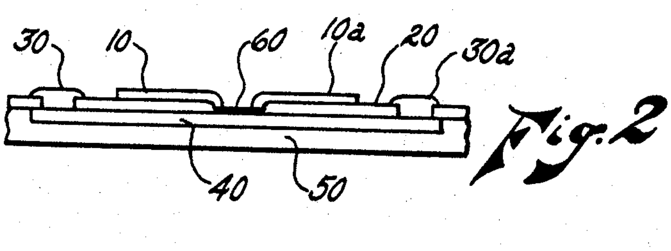
FIGURE 2 illustrates a second embodiment of the present invention.

Another technique for building the device of the present invention is shown in FIGURE 2, which shows single crystal wafer 50 with oxidized layer 20, the wafer being of N or p-type into which the opposite type resistivity layer 40 is diffused to a thickness of one micron. The oxide is then etched and 1000 angstroms redeposited in the active area, contact holes are etched out, ohmic contacts made, and metal contacts 30 and 30*a* and control plates 10 and 10*a* are deposited with slot 60 formed therebetween. Individual devices may be isolated on the silicon wafer by reverse biasing the resistor substrate junctions.

What I claim is:

1. The method of fabricating a semiconductor device whose resistivity is modulated by an applied voltage comprising electron beam evaporating silicon onto a polished sapphire substrate at $1 \times 10^{-8}$ torr pressure to a thickness of two microns to form a semiconductor resistor strip, applying a photoresist mask and etching away all the silicon except a square of preselected dimensions, thermally oxidizing to an oxide thickness of .5 microns, etching a slot of preselected dimensions through the oxide at the center of said resistor strip, pyrolytically depositing 1000 angstroms of oxide onto the surface of said slot, etching out contact areas through each end of said resistor strip, evaporating 1000 angstroms of aluminum over the top surface and etching away all but that which covers said contact areas, raising the temperature of said substrate to 570° C. approximately two minutes to alloy the aluminum and silicon at the contacts, evaporating 10,000 angstroms of aluminum onto the entire top surface, etching out contact pads at said contacts, etching out a pair of control plates with said control plates separated by a preselected distance, and ultrasonically bonding wires to said contact pads and said control plates.

References Cited

UNITED STATES PATENTS

| | | | |
|---|---|---|---|
| 3,258,663 | 6/1966 | Weimer. | |
| 3,298,863 | 1/1967 | McCusker | 117—212 |
| 3,358,198 | 12/1967 | Van Overbeek | 29—571 X |

WILLIAM I. BROOKS, *Primary Examiner.*

U.S. Cl. X.R.

29—589, 571, 578, 610; 338—13